United States Patent [19]
Schlatter

[11] 3,732,406
[45] May 8, 1973

[54] ANALOG MULTIPLIER AND SQUARE ROOT EXTRACTOR HAVING A PLURALITY OF STRAIN GAGES CONNECTED IN A BRIDGE CIRCUIT

[75] Inventor: Gerald Lance Schlatter, Boulder, Colo.

[73] Assignee: International Telephone and Telegraph Corporation, New York, N.Y.

[22] Filed: July 8, 1971

[21] Appl. No.: 160,750

[52] U.S. Cl. ......... 235/151.34, 235/179, 235/193.5, 325/194, 338/4
[51] Int. Cl. ......... G06g 7/16, G06g 7/20, G06g 7/57, G01l 1/22
[58] Field of Search ............... 235/151.34, 194, 235/195, 196, 193.5, 179, 183; 73/194, 194 E, 205 R, 205 D, 206; 338/2, 4, 6

[56] References Cited

UNITED STATES PATENTS

| | | |
|---|---|---|
| 3,218,445 | 11/1965 | Fluegel ........................ 235/179 X |
| 3,061,197 | 1/1962 | Newbold ................. 235/151.34 X |
| 3,096,434 | 7/1963 | King ............................ 235/151.34 |
| 3,300,630 | 1/1967 | Hartenstein .................. 235/179 X |
| 3,532,869 | 10/1970 | Talmo ..................... 235/151.34 X |

*Primary Examiner*—Joseph F. Ruggiero
*Attorney*—C. Cornell Remsen, Jr. et al.

[57] ABSTRACT

Computers for a mass flowmeter that produce a total pulse output directly proportional to total mass flow. Differential pressure (DP) unit and densitometer analog outputs are multiplied by passing a density current analog through the unit strain gage bridge. A square root extractor incorporating three integrators utilize the positive and negative sawtooth outputs of two integrators alternately as an input to the third. The absolute values of the sawtooth slopes is directly proportional to the DP-density product. The output of the third integrator is level detected to switch the two integrators on and off. The switching frequency is then directly proportional to the square root of the DP-density product, and the total switching count is directly proportional to the total mass flow.

11 Claims, 5 Drawing Figures

ANALOG MULTIPLIER AND SQUARE ROOT EXTRACTOR HAVING A PLURALITY OF STRAIN GAGES CONNECTED IN A BRIDGE CIRCUIT

BACKGROUND OF THE INVENTION

This invention relates to the computing art, and more particularly to analog devices for multiplying or for extracting the square root of a variable.

In the past it has been the practice to multiply the static pressure times the differential pressure (DP) across an orifice to obtain a rate of flow signal. See U.S. Pat. No. 3,532,869.

In obtaining total mass flow with differential pressure and density, a square root is involved. Certain square root extractors are old in some arts. For example, see U.S. Pat. Nos. 3,016,197; 3,096,434; and 3,484,593.

Notwithstanding the foregoing, prior art multipliers and square root extractors are generally complex equipments.

SUMMARY OF THE INVENTION

In accordance with the device of the present invention, the above-described and other disadvantages of the prior art are overcome by providing an analog multiplier and/or an analog square root extractor.

In accordance with one feature of the present invention, a multiplier is provided using, for example, the strain gage bridge of a DP unit which is supplied with a DC voltage, and a current directly proportional to an input variable. When the DP unit is connected across an orifice in a pipeline and the input variable is fluid density, the multiplier output is directly proportional to the product of fluid density and differential pressure.

In accordance with a further feature of the invention, a square root extractor is provided which is capable of producing output pulses at a pulse repetition frequency (PRF) directly proportional to the square root of the magnitude of the input signal thereto. When this input signal is a DC analog of the said DP-density product, a counter may be provided to count the square root extractor output pulses, which counter may be calibrated to read directly in mass. The counter reading will then be directly proportional to total mass flow.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
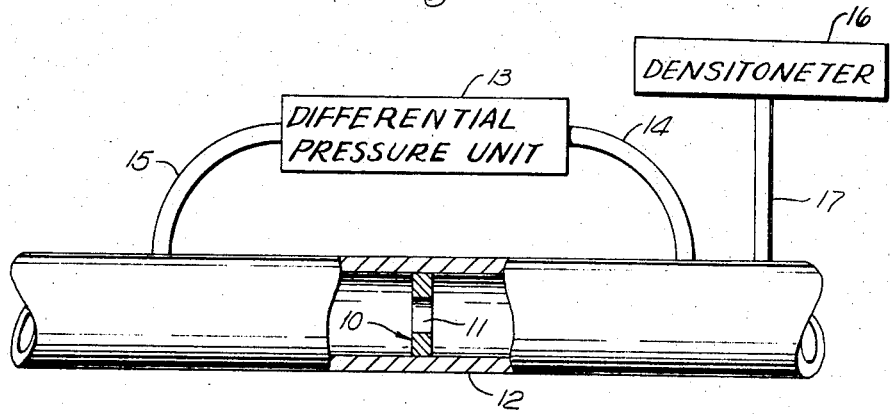
FIG. 1 is a side elevational view, partly in section, of a portion of the system of the present invention.

In the drawing in FIG. 1, a plate 10 is shown having an orifice 11 in a pipeline 12. A differential pressure unit (DPU) 13 is connected across orifice 11 by conduits 14 and 15. A densitometer 16 is connected from pipeline 12 by a conduit 17.

DPU 13 may be entirely conventional. If desired, DPU 13 may be identical to that disclosed in U.S. Pat. No. 3,343,420.

Figure 2:
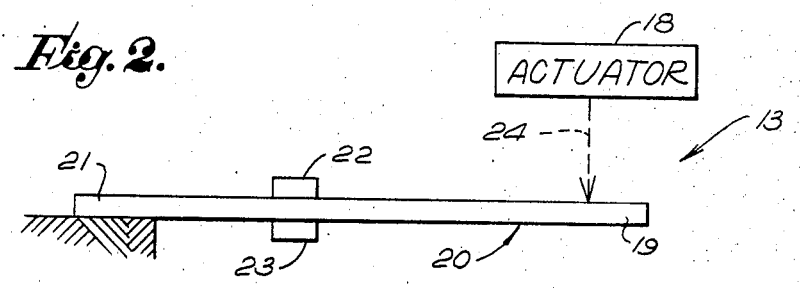
FIG. 2 is a diagrammatic view of a differential pressure unit shown in FIG. 1.

DPU 13 may include an actuator as indicated at 18 in FIG. 2 which supplies a force to a free end 19 of a cantilever beam 20 to deflect it. Beam 20 has a fixed end 21 and strain gages 22 and 23 bonded to each side thereof between ends 19 and 21. Thus, if actuator 18 supplies a force in the direction of an arrow 24, strain gage 22 will be placed in tension while strain gage 23 will be placed in compression. Strain gages 22 and 23 are connected in a bridge 25, as shown in FIG. 3.

Figure 3:
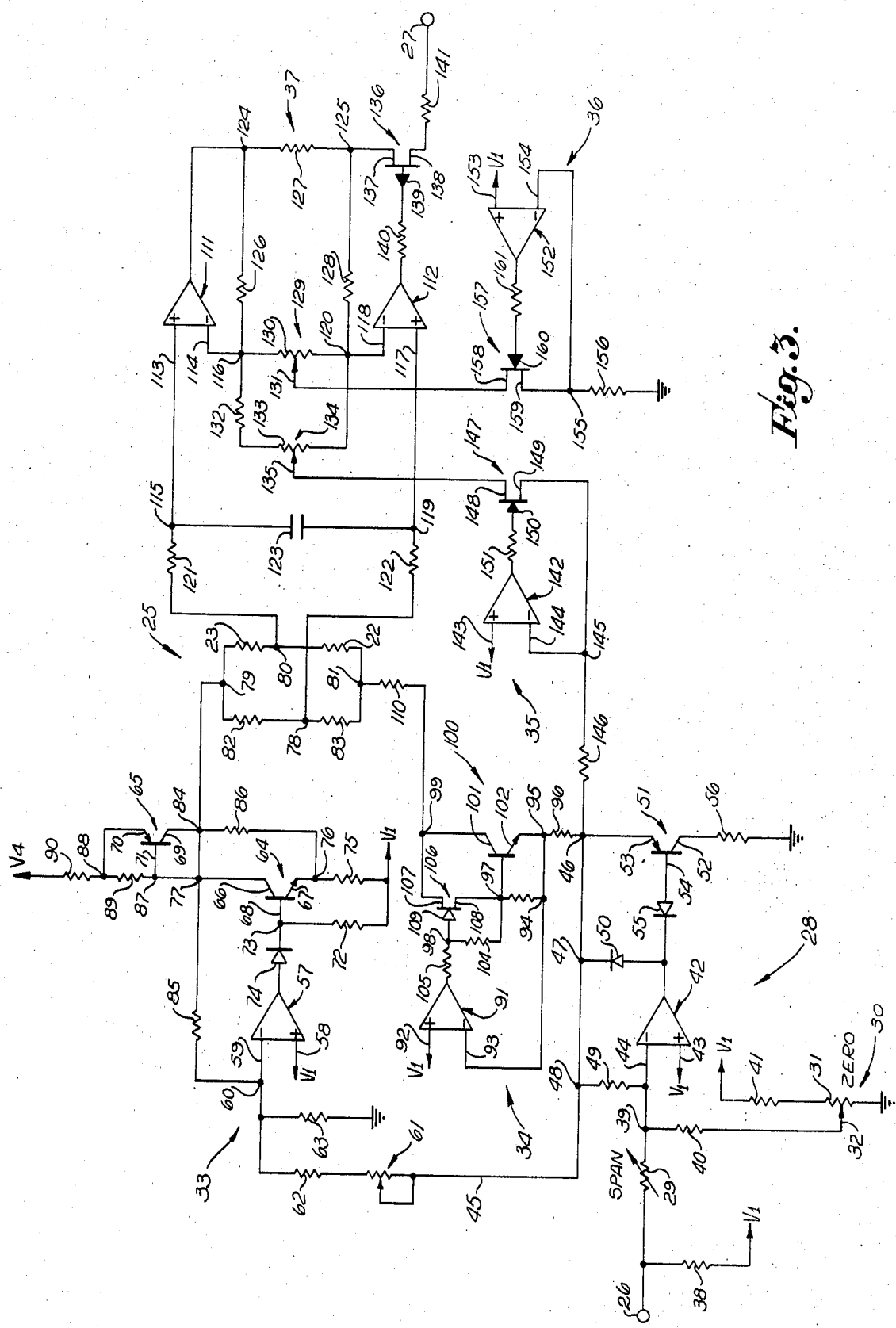
FIGS. 3 and 4 are schematic diagrams of still other portions of the present invention.

The circuit of FIG. 3 is an analog multiplier. It multiplies an electrical analog directly proportional to differential pressure times an electrical analog directly proportional to density. The density analog is supplied via a terminal 26, shown in FIG. 3. The product output of FIG. 3 is taken as a current analog at an output terminal 27. The density analog is supplied by densitometer 16 at input terminal 26. Densitometer 16 may be any conventional densitometer. However, densitometer 16 is preferably of the type disclosed in copending application, Ser. No. 65,371 filed Aug. 20, 1970, by C. E. Miller and G. L. Schlatter for DENSITOMETER. Said copending application is hereby incorporated by this reference hereto into this application as though fully set forth herein hereat.

The circuit of FIG. 3 contains a number of smaller circuits therein. One of these circuits is an input circuit 28 which includes a variable resistor 29 which can adjust the span of the density analog voltage applied to terminal 26. A potentiometer 30 has a resistive winding 31 and a wiper 32. The adjustment of wiper 32 can adjust the zero of the analog voltage applied to input terminal 26.

A level shifting circuit is indicated at 33. A voltage-to-current converter is indicated at 34. Constant current sources are indicated at 35 and 36. An output circuit is indicated at 37.

A resistor 38 is connected from terminal 26 to a potential V1. Resistor 29 is connected from terminal 26 to a junction 39. A resistor 40 is connected between junction 39 and wiper 32. A resistor 41 and a winding 31 are connected in series from potential V1 to ground. A differential amplifier 42 has plus and minus inputs 43 and 44, respectively, connected to potential V1 and junction 39. Circuit 33 has an input lead 45 with junctions 46, 47 and 48 therealong. A resistor 49 is connected from amplifier input 44 to junction 48. A diode 50 is connected from the output of amplifier 42 to junction 47. Circuit 28 includes a transistor 51 having a collector 52, an emitter 53 and a base 54. A diode 55 is connected from the output of amplifier 42 to base 54. A resistor 56 is connected from collector 52 to ground. Emitter 53 is connected to junction 46. Circuit 33 includes an amplifier 57 having plus and minus inputs 58 and 59, respectively, connected to potential V1 and a junction 60. A variable resistor 61 and a resistor 62 are connected from lead 45 to junction 60. A resistor 63 is connected from junction 60 to ground.

Circuit 33 also includes a transistor 64 and a transistor 65. Transistor 64 has a collector 66, an emitter 67 and a base 68. Transistor 65 has a collector 69, an emitter 70 and a base 71. A resistor 72 is connected from a junction 73 to potential V1. A diode 74 is connected from the output of amplifier 57 to junction 73. A resistor 75 is connected from a junction 76 to potential V1. Emitter 67 is connected to junction 76. Collector 66 is connected to an output junction 77.

Bridge 25 has corners 78, 79, 80 and 81. A resistor 82 is connected between junctions 78 and 79. A resistor 83 is connected between junctions 78 and 81. A junction 84 and junctions 77 and 79 are connected together. Amplifier 57 has a feedback resistor 85 connected between junctions 60 and 77. A resistor 86 is also connected between junctions 76 and 84. Collector 69 is connected to junction 84. Base 71 is connected to a junction 87. Emitter 70 is connected to a junction 88. A resistor 89 is connected between junctions 87 and 88. A resistor 90 is connected from junction 88 to a potential V4. Converter 34 includes an amplifier 91 having plus and minus input leads 92 and 93 respectively connected to potential V1 and a junction 94. A junction 95 is connected to junction 94. A resistor 96 is connected between junctions 46 and 95. Converter 34 also includes junctions 97, 98 and 99. Converter 34 includes a transistor 100 having a collector 101, an emitter 102 and a base 103. Base 103 is connected to junction 97. Collector 101 is connected to junction 99. Emitter 102 is connected to junction 95. A resistor 104 is connected between junctions 97 and 98. A resistor 105 is connected between the output of amplifier 91 and junction 98. A field effect transistor 106 is provided with a drain 107, a source 108 and a gate 109. Gate 109 is connected to junction 98. Drain 107 is connected to junction 99. Source 108 is connected to junction 97. A resistor 110 is connected from bridge junction 81 to junction 99.

Circuit 37 includes differential amplifiers 111 and 112. Amplifier 111 has a plus input lead 113 and a minus input lead 114 connected respectively from junctions 115 and 116. Amplifier 112 has a plus input lead 117 and a minus input lead 118 connected from junctions 119 and 120, respectively. A resistor 121 is connected between junctions 80 and 115. A resistor 122 is connected between junctions 78 and 119. A capacitor 123 is connected between junctions 115 and 119.

Circuit 37 includes junctions 124 and 125. The output of amplifier 111 is connected to junction 124. A resistor 126 is connected between junctions 116 and 124. Resistor 127 is connected between junctions 124 and 125. A resistor 128 is connected between junctions 120 and 125. Circuit 37 includes a potentiometer 129 having a resistive winding 130 and a wiper 131. Winding 130 is connected between junctions 116 and 120. A resistor 132 and a potentiometer winding 133 of a potentiometer 134 are connected in that order from junction 116 to 120, potentiometer 134 having a wiper 135.

Circuit 37 also includes a field effect transistor 136 having a drain 137, a source 138 and a gate 139. Drain 137 is connected to junction 125. A resistor 140 is connected from the output of amplifier 112 to gate 139. A resistor 141 is connected from source 138 to output terminal 27.

Source 35 includes an amplifier 142 having plus and minus input leads 143 and 144, respectively, connected to potential V1 and a junction 145. A resistor 146 is connected between junctions 46 and 145. Source 35 also includes a field effect transistor 147 having a drain 148, a source 149 and a gate 150. A resistor 151 is connected from the output of amplifier 142 to gate 150. Drain 148 is connected to wiper 135. Source 149 is connected to junction 145.

Source 36 includes an amplifier 152 having positive and negative input leads 153 and 154 respectively connected to potential V1 and a junction 155. A resistor 156 is connected from junction 155 to ground. Source 36 also includes a field effect transistor 157 having a drain 158, a source 159 and a gate 160. A resistor 161 is connected from the output of amplifier 152 to gate 160. Drain 158 is connected from wiper 131. Source 159 is connected to junction 155.

OPERATION OF THE MULTIPLIER OF FIG. 3

In the operation of the analog multiplier of FIG. 3, multiplication is achieved for two reasons. In the first place, the output of bridge 25, if the density product were not desired, would be directly proportional to differential pressure. However, converter 34 makes the current through resistor 110 directly proportional to density. This means that the total bridge current will always be directly proportional to density. For this reason, the difference between the voltages between bridge junctions 78 and 80 will be directly proportional to the product of the differential pressure and the density.

Circuit 33 merely supplies a voltage at bridge junction 79 which is proportional to the sum of first and second voltages. The first voltage is directly proportional to density. The second voltage is a constant voltage. The effect of circuit 33 is to maintain the potential of bridge junction 78 constant and independent of differential pressure and density. The main purpose of circuit 33 is to correct for any nonlinearity differences between amplifiers 111 and 112. In other words, the correction is made to improve the common mode rejection ratio.

Amplifiers 111 and 112 simply subtract the voltages appearing at junctions 80 and 78, respectively. The output at terminal 27 is a current analog. Thus, substantially all the current going through resistor 27 is output current to terminal 127. Amplifier 111 will produce an output to drive the voltage on minus input lead 114 substantially equal to that on plus input lead 113. The same is true of amplifier 112. The feedback is supplied through resistors 126 and 128, respectively. Transistor 136 is employed simply to detect the output voltage of amplifier 112 without drawing current.

Source 35 compensates for the fact that it is impossible to obtain two strain gages for bridge 25 as at 22 and 23 which are identical in all of their electrical characteristics.

Source 36 compensates for the "zero shift," offset or zeroing of amplifiers 111 and 112.

When the square root of the current analog at the output of terminal 27 is taken, this square root is directly proportional to rate of mass flow. This square root is taken by the circuit of FIG. 4, and total mass flow is recorded in a counter 162.

Figure 4:
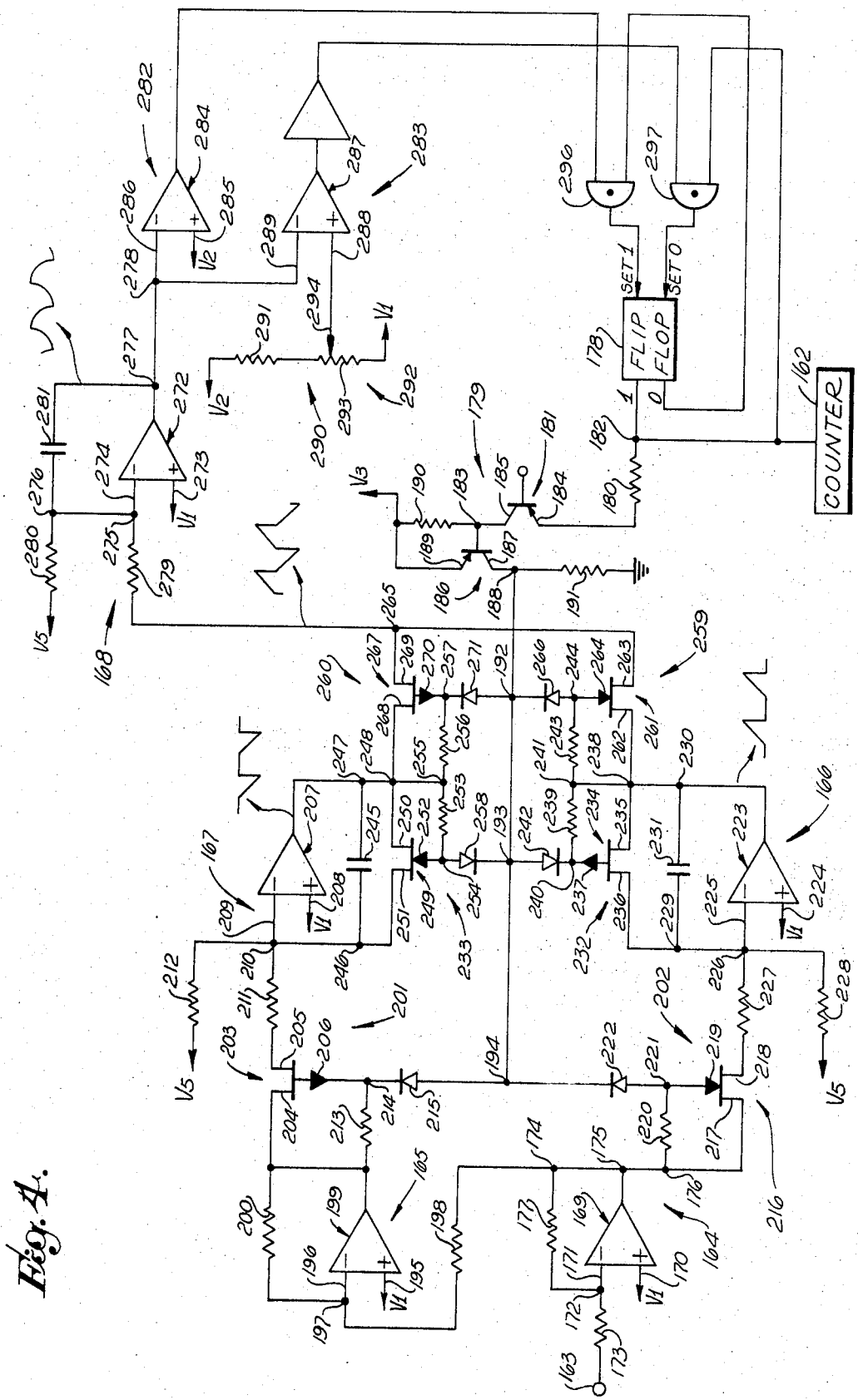

Output terminal 27 in FIG. 3 is connected to input terminal 163 in FIG. 4. A current-to-voltage converter is indicated at 164. An inverter is indicated at 165. An integrator is indicated at 166. Another integrator is indicated at 167. Still another integrator is indicated at 168.

In FIG. 4, converter 164 includes an amplifier 169 having positive and negative input leads 170 and 171 connected respectively to potential V1 and a junction 172. An input resistor 173 is connected from input terminal 163 to junction 172. Junctions 174, 175 and 176 are connected from the output of amplifier 169. A resistor 177 is connected between junctions 172 and 174.

A flip-flop 178 operates counter 162 and a switching circuit 179 connected therefrom by a resistor 180 and a diode-connected transistor 181 connected in series from a junction 182 to a junction 183. Transistor 181 has an emitter 184 connected from resistor 180 and a collector 185 connected to junction 183. Circuit 179 also includes a transistor 186 having a collector 187 connected to a junction 188 and an emitter 189 connected to a potential V3. A resistor 190 is connected from junction 183 to potential V3. A resistor 191 is connected from junction 188 to ground. Junctions 192, 193 and 194 are connected from junction 188. Inverter 165 has plus and minus input leads 195 and 196 connected from potential V1 and a junction 197, respectively. A resistor 198 is connected between junctions 174 and 197. Inverter 165, including amplifier 199, has a feedback resistor 200. Inverter 165 and converter 164 are connected to integrators 167 and 166 by switching circuits 201 and 202, respectively. Circuit 201 includes a field effect transistor switch 203 having a drain 204, a source 205 and a gate 206. Integrator 167 includes an amplifier 207 having plus and minus input leads 208 and 209 respectively connected to potential V1 and a junction 210. A resistor 211 is connected between source 205 and junction 210. A resistor 212 is connected from a potential V5 to junction 210. Source 204 is connected from the output of amplifier 199. A resistor 213 is connected from the output of amplifier 199 to a junction 214. Gate 206 is connected to junction 214. A diode 215 is connected between junctions 194 and 214.

Circuit 202 similarly includes a field effect transistor switch 216 having a drain 217, a source 218 and a gate 219. A resistor 220 is connected between junction 176 and a junction 221. Drain 217 is connected from junction 176. Gate 219 is connected to junction 221. A diode 222 is connected between junctions 194 and 221.

Integrator 166 includes am amplifier 223 having plus and minus input leads 224 and 225 respectively connected to potential V1 and a junction 226. A resistor 227 is connected between source 218 and junction 226. A resistor 228 is connected between a potential V5 ad junction 226. Junction 226 is connected to a junction 229. The output of amplifier 223 is connected to a junction 230. A capacitor 231 is connected between junctions 229 and 230.

Resetting switching circuits 232 and 233 are provided for integrators 166 and 167, respectively. Circuit 232 includes a field effect transistor 234 having a drain 235, a source 236 and a gate 237. Drain 235 is connected from a junction 238, junctions 230 and 238 being connected together. Source 236 is connected to junction 229. A resistor 239 is connected between junctions 240 and 241. A diode 242 is connected between junctions 193 and 240. A resistor 243 is connected between junction 241 and a junction 244.

Circuit 233 includes a capacitor 245 connected between junctions 246 and 247. Junctions 210 and 246 are connected together. The output of amplifier 207 is connected to junction 247. Junction 247 is connected to a junction 248. Circuit 233 includes a field effect transistor 249 having a drain 250, a source 251 and a gate 252. A resistor 253 is connected from a junction 254 to a junction 255. A resistor 256 is connected from junction 255 to a junction 257. Drain 250 is connected to junction 248. Source 251 is connected to junction 246. Gate 252 is connected to junction 254. Junctions 248 and 255 are connected together as are junctions 238 and 241. A diode 258 is connected between junctions 193 and 254.

The outputs of integrators 166 and 167 are alternately used. For this purpose, additional switching circuits are provided at 259 and 260. Circuit 259 includes a field effect transistor 261 having a drain 262, a source 263 and a gate 264. Drain 262 is connected to junction 238. Source 263 is connected to a junction 265. Gate 264 is connected to junction 244. A diode 266 is connected between junctions 192 and 244.

Similarly, in circuit 260, a field effect transistor 267 is provided including a drain 268, a source 269 and a gate 270. Drain 268 is connected to junction 248. Source 269 is connected to junction 265. Gate 270 is connected to junction 257. A diode 271 is connected between junctions 192 and 257.

Integrator 168 includes an amplifier 272 having plus and minus input leads 273 and 274 connected respectively from potential V1 and a junction 275. Integrator 168 also includes junctions 276, 277 and 278. A resistor 279 is connected from junction 265 to junction 275. A resistor 280 is connected from potential V5 to junction 276. A capacitor 281 is connected from junction 276 to junction 277.

Threshold detectors are indicated at 282 and 283. Detector 282 includes an amplifier 284 having plus and minus input leads 285 and 286 respectively connected to potential V2 and junction 278.

Detector 283 includes an amplifier 287 having plus and minus input leads 288 and 289. Lead 289 is connected to junction 278. A bias circuit 290 is provided for detector 283 including a resistor 291 and a potentiometer 292. Potentiometer 292 includes a resistive winding 293 and a wiper 294. REsistor 291 and winding 293 are connected in that order from potential V2 to potential V1. Wiper 294 is connected to lead 288. An inverter 295 is connected to the output of amplifier 287. Flip-flop 178 is set by two AND gates 296 and 297. AND gate 296 receives one input from amplifier 284 and another input from the "0" output of flip-flop 178. Gate 297 receives one input from the output of inverter 295, and another input from the "1" output of flip-flop 178. The output of gate 296 is employed as the set "1" input of flip-flop 178. The output of gate 297 is employed as the set "0" input of flip-flop 178. The "1" output of flip-flop 178 is employed to produce the switch functions to be described and to supply pulses to counter 162. Counter 162 may be connected either to the "1" output or to the "0" output of flip-flop 178.

Figure 5:
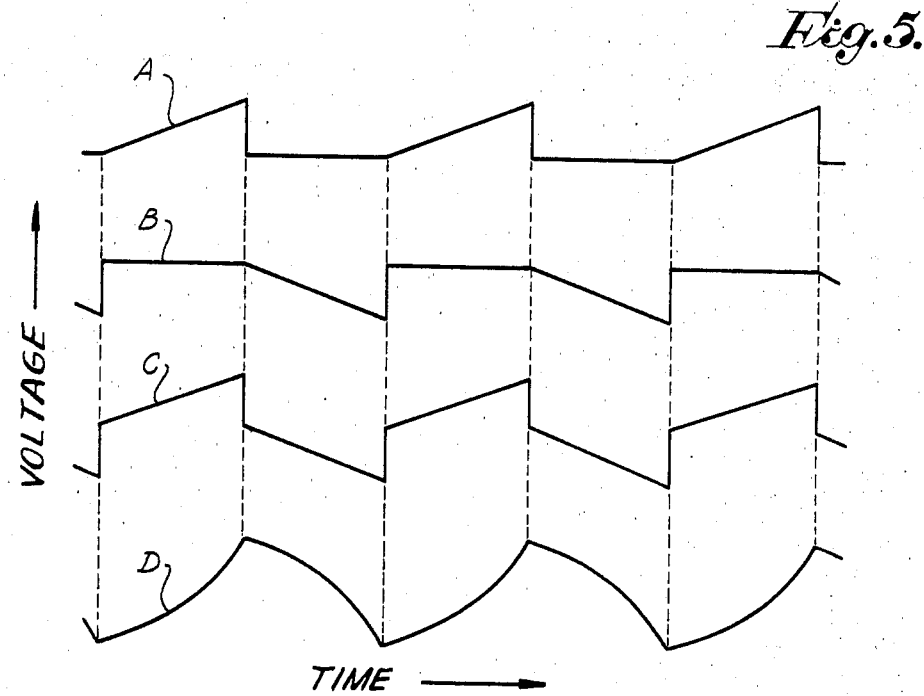
FIG. 5 is a graph of a group of waveforms characteristic of the operation of the invention.

Waveform A, shown in FIG. 5, represents the potential at the output of integrator 166 in FIG. 4. This potential will be found at the output of amplifier 223. Similarly, the output of amplifier 207 is indicated at B. The potential of junction 265 is indicated at C. The potential at the output of amplifier 272 is indicated at D.

OPERATION OF THE SQUARE ROOT EXTRACTOR SHOWN IN FIG. 4

The purpose of the inverter 165, shown in FIG. 4, is to make sure the ramp portion of the waveform B, shown in FIG. 5, has a negative slope directly proportional to the output current of FIG. 3. Similarly, the absence of an inverter at 166 makes certain that the ramp portion of waveform A has a positive slope.

The switching functions produced combine only the ramp portions of waveforms A and B at C. When waveform C is integrated, waveform D is obtained. The output of integrator 168 is thus waveform D. Detector 282 is employed to produce a high output signal immediately before or at the peaks of waveform D. Detector 283 produces a low output at or slightly above the valleys of waveform D. The low output voltage of amplifier 287 is then converted to a high output voltage by inverter 295.

Field effect transistors 216, 203, 234, 249, 261 and 267 form electronic switches. The source-to-drain impedance is thus practically infinite when the switch is open and practically zero when it is closed. Transistors 216 and 203 are opposite conductivity types. Thus, for the same gating signal on junction 194, one is closed while the other is open, and vice versa. The same is true of transistors 234 and 249. The same is also true of transistors 261 and 267. This accounts for the fact the waveform A is flat where waveform B is not, and vice versa. Transistors 234 and 249 are resetting transistors which short circuit corresponding capacitors 231 and 245, respectively, whey they are to be discharged. Transistor 261 alternately switches only the ramp outputs of integrator 166 to junction 265. Similarly, transistor 267 selects only the ramp output portions of waveform B for connection to junction 265.

In operation, when detector 282 detects a peak in curve D, flip-flop 178 is set to the "1" state, and for the next succeeding interval field effect transistor switches 216, 249 and 261 are opened, while field effect transistor switches 203, 234 and 267 are closed. During this interval, capacitor 231 is discharged, and the output of amplifier 233 is flat. Integrator 167 then integrates in a negative direction, and the negative sawtooth is applied to junction 265 by integrator 167. Integrator 168 then integrates down until detector 283 detects the minimum excursion and sets flip-flop 178 to the "0" state. During this interval, the reverse occurs. That is, field effect transistor switches 216, 249 and 261 are closed, while field effect transistor switches 203, 234 and 267 are opened.

In accordance with the foregoing, since the current input to terminal 163 in FIG. 4 is directly proportional to the product of density and differential pressure, the pulse repetition frequency at the output of flip-flop 178 will be directly proportional to the rate of mass flow in pipeline 12. Counter 162 will thus register the total mass flow and may be so calibrated, if desired. The word "amplifier" and the phrase "second means" are hereby defined for use herein and in the claims to include, but not be limited to, input circuit 28 in FIG. 3. The lead connecting emitter 53 to junction 46 may thus be described as the output lead of amplifier 28, if desired. Junction 46 has a potential $E_{46}$ which varies as $$E_{46} = V1 - Kd \tag{1}$$

where $K$ is a constant and $d$ is density. (Note that the noninverting input of amplifier 42 is referenced to $+V1$.) The minus sign in equation (1) is used for a positive constant $K$ because amplifier 28 is an inverting amplifier. The current $i_{96}$ through resistor 96 is then $$i_{96} = (E_{95} + V1 + Kd/R_{96}) \tag{2}$$

where $E_{95}$ is the potential of junction 95 and $R_{96}$ is the resistance of resistor 96. In other words, current $i_{96}$ is the total bridge current. Note that all the bridge current goes through resistor 96. The output current of amplifier 91 is negligible compared to $i_{96}$ because of the current gains of transistors 100 and 106.

The phrase "variable resistance means" is hereby defined for use herein and in the claims to mean one or more or all of the parts 100, 104, 105, 106, 110 and the resistor connected between junctions 94 and 97, or the equivalent of one or more or all of such parts.

Amplifier 91, as differential amplifiers conventionally do, may have a gain of 100,000 to 500,000 or so. Thus, amplifier 91 drives junction 95 effectively to potential V1 because amplifier 91 will not tolerate a difference in potential between its inverting and noninverting inputs of more than about one one-hundred thousandth or one five-hundred thousandth or so. Junction 95 is driven to $V1$ by resistance of the said variable resistance means connected in series with the bridge. Note that V1 is fixed or constant. Thus, $$i_{96} = (V1 - V1 + Kd)/R_{96} \tag{3}$$

Then the total bridge current $i_{96}$ is directly proportional to potential $Kd$ and to density $d$ because $V1$ is constant. Moreover, if $V1$ is considered the reference voltage throughout the drawings as ground usually is, ground may be $-V1$ and $V1$ may be zero. In any event, $$i_{96} = (Kd)/R_{96} \tag{4}$$

What is claimed is:

1. Apparatus for deriving an analog signal directly proportional to the product of a force and a predetermined variable, said apparatus comprising: a base; a cantilever beam having one end fixed to said base; an actuator to supply the force to the other end of said beam; a bridge including first and second legs having first and second strain gages, respectively, fixed to opposite sides of said beam in positions to be placed in tension and compression, respectively, when said actuator deflects said other beam end in one direction, said bridge having third and fourth legs including third and fourth resistors, said bridge having first, second, third and fourth corner junctions, said first strain gage being connected between said first and second junctions, said second strain gage being connected between said first and fourth junctions, said third resistor being connected between said second and third junctions, said fourth resistor being connected between said third and fourth junctions; first means connected between a point of reference potential and one of said second and fourth junctions to supply a potential thereto different from that of said point; second means connected between said point and the other of said second and fourth junctions to maintain the current from said other junction directly proportional to the magnitude of the predetermined variable; and third means connected from said first and third junctions for producing an output signal of a magnitude directly proportional to the difference between the potentials of said first and third junctions.

2. Apparatus for deriving an analog signal directly proportional to the product of a force and a predetermined variable, said apparatus comprising: a base; a cantilever beam having one end fixed to said base; an actuator to supply the force to the other end of said beam; a bridge including first and second legs having first and second strain gages, respectively, fixed to opposite sides of said beam in positions to be placed in tension and compression, respectively, when said actuator deflects said other beam end in one direction, said bridge having third and fourth legs including third and fourth resistors, said bridge having first, second, third and fourth corner junctions, said first strain gage being connected between said first and second junctions, said second strain gage being connected between said first and fourth junctions, said third resistor being connected between said second and third junctions, said fourth resistor being connected between said third and fourth junctions; first means connected between a point of reference potential and one of said second and fourth junctions to supply a potential thereto different from that of said point; second means connected between said point and the other of said second and fourth junctions to maintain the current from said other junction directly proportional to the magnitude of the predetermined variable; and third means connected from said first and third junctions for producing an output signal of a magnitude directly proportional to the difference between the potentials of said first and third junctions, said third means including first and second differential amplifiers each having plus and minus inputs, a fifth resistor connected from said first junction to the plus input of said first amplifier, a sixth resistor connected from said third junction to the plus input of said second amplifier, a capacitor connected between said plus inputs, fifth and sixth junctions connected to the minus inputs of said first and second amplifier, respectively, a seventh resistor connected between the output of said second amplifier and said sixth junction, a P-channel type field effect transistor having a source, a drain and a gate, an eighth resistor connected from the output of said first amplifier to said gate, a ninth resistor connected from the output of said second amplifier to said drain, a tenth resistor connected from said drain to said fifth junction, first and second potentiometers having first and second windings and first and second wipers, respectively, said first winding being connected between said fifth and sixth junctions, an eleventh resistor having one end connected from said sixth junction, said second winding being connected from the other end of said eleventh resistor to said fifth junction, fourth means to produce an input signal directly proportional to the predetermined variable, said second means being connected from said fourth means, fifth means connected from said fourth means to said second wiper to keep the current therefrom directly proportional to the magnitude of said input signal, and sixth means connected from said first wiper to said point of reference potential to maintain the current from said first wiper constant, the potential of said one junction being positive with respect to that of said point of reference potential.

3. The invention as defined in claim 2, wherein said first means is also connected from said fourth means, said first means supplying a potential to said one junction equal to the sum of first and second potentials, said first potential being directly proportional to said input signal, said second potential being constant.

4. The invention as defined in claim 3, wherein said first potential is of a magnitude to maintain one of said first and third junctions at a constant potential relative to that of said point and independent of the magnitude of said input signal.

5. Apparatus for deriving an analog signal directly proportional to the product of a force and a predetermined variable, said apparatus comprising: a base; a cantilever beam having one end fixed to said base; an actuator to supply the force to the other end of said beam; a bridge including first and second legs having first and second strain gages, respectively, fixed to opposite sides of said beam in positions to be placed in tension and compression, respectively, when said actuator deflects said other beam end in one direction, said bridge having third and fourth legs including third and fourth resistors, said bridge having first, second, third and fourth corner junctions, said first strain gage being connected between said first and second junctions, said second strain gage being connected between said first and fourth junctions, said third resistor being connected between said second and third junctions, said fourth resistor being connected between said third and fourth junctions; first means connected between a point of reference potential and one of said second and fourth junctions to supply a potential thereto different from that of said point; second means connected between said point and the other of said second and fourth junctions to maintain the current from said other junction directly proportional to the magnitude of the predetermined variable; and third means connected from said first and third junctions for producing an output signal of a magnitude directly proportional to the difference between the potentials of said first and third junctions; fourth means being provided to produce an input signal directly proportional to said predetermined variable, said first and second means both being connected from said fourth means, said first means supplying a potential to said one junction equal to the sum of first and second potentials, said first potential being directly proportional to said input signal, said second potential being constant.

6. The invention as defined in claim 3, wherein said first potential is of a magnitude to maintain one of said first and third junctions at a constant potential relative to that of said point and independent of the magnitude of said input signal.

7. A square root extractor comprising: first means to provide an input signal; first, second and third integrators; at least a first inverter connected from the output of said first means; a first sampling switch connected from the output of said first inverter to the input of said first integrator; a second sampling switch connected from the output of said first means to the input of said second integrator; a third resetting switch connected to said first integrator; a fourth resetting switch connected to said second integrator; a fifth switch connected from the output of said first integrator to the input of said third integrator; a sixth switch connected from the output of said second integrator to the input of said third integrator; second means connected from the output of said third integrator for producing a bilevel output signal, said bilevel signal being produced synchronously with the output signal of said third integrator, said bilevel signal changing levels at the maximum and minimum values of said third integrator output signal; and third means connected from the output of said second means for alternately opening and closing all of said switches in accordance with the level of said bilevel signal, said second, third and sixth switches being closed while said first, fourth and fifth switches are opened, and vice versa, said third means being adapted to close said first, fourth and fifth switches beginning at the peaks of the output signal of said third integrator, the rate at which pulses are generated by said second means being directly proportional to the square root of the magnitude of said input signal.

8. The invention as defined in claim 7, wherein a pulse counter is connected from the output of said second means to register the integral of said square root with respect to time, said square root integral being directly proportional to total mass flow of a fluid in a pipeline when the magnitude of said input signal is directly proportional to the product of the differential pressure across an orifice therein and the density of the fluid therein.

9. The invention as defined in claim 8, wherein said second means includes a second inverter, first and second threshold detectors, a flip-flop, and first and second AND gates, said first detector producing a high output at the maximum amplitude of the output signal of said third integrator, said second detector producing a low output at the minimum amplitude of the output signal of said third integrator, said first gate having one input from the "0" output of said flip-flop and another input from the output of said first detector, both of said detectors having their inputs connected from the output of said third integrator, said first gate having an output connected to the set "1" input of said flip-flop, said second inverter being connected from the output of said second detector to one input of said second gate, said second gate having another input connected from the "1" output of said flip-flop, said second gate having an output connected to the set "0" input of said flip-flop, said third means being connected from the "1" output of said flip-flop.

10. The invention as defined in claim 7, wherein said second means includes a second inverter, first and second threshold detectors, a flip-flop, and first and second AND gates, said first detector producing a high output at the maximum amplitude of the output signal of said third integrator, said second detector producing a low output at the minimum amplitude of the output signal of said third integrator, said first gate having one input from the "0" output of said flip-flop and another input from the output of said first detector, both of said detectors having their inputs connected from the output of said third integrator, said first gate having an output connected to the set "1" input of said flip-flop, said second inverter being connected from the output of said second detector to one input of said second gate, said second gate having another input connected from the "1" output of said flip-flop, said second gate having an output connected to the set "0" input of said flip-flop, said third means being connected from the "1" output of said flip-flop.

11. Apparatus for deriving an analog signal directly proportional to the product of a force and a predetermined variable, said apparatus comprising: a base; a cantilever beam having one end fixed to said base; an actuator to supply the force to the other end of said beam; a bridge including first and second legs having first and second strain gages, respectively, fixed to opposite sides of said beam in positions to be placed in tension and compression, respectively, when said actuator deflects said other beam end in one direction, said bridge having third and fourth legs including third and fourth resistors, said bridge having first, second, third and fourth corner junctions, said first strain gage being connected between said first and second junctions, said second strain gage being connected between said first and fourth junctions, said third resistor being connected between said second and third junctions, said fourth resistor being connected between said third and fourth junctions; first means connected between a point of reference potential and one of said second and fourth junctions to supply a potential thereto different from that of said point; second means having an output lead, said second means maintaining the potential of said output lead directly proportional to the predetermined variable; a pick-off junction; a fifth resistor connected between said output lead and said pick-off junction; variable resistance means connected between the other of said second and fourth junctions and said pick-off junction; a voltage amplifier connected from said pick-off junction and a fixed potential to said variable resistance means to vary the resistance of said variable resistance means between said other and pick-off junctions in a manner to keep the potential of said pick-off junction effectively constant; and third means connected from said first and third junctions for producing an output signal of a magnitude directly proportional to the difference between the potentials of said first and third junctions.

* * * * *